United States Patent
Wantuch et al.

(10) Patent No.: US 6,509,077 B1
(45) Date of Patent: Jan. 21, 2003

(54) RELEASE COATING FOR LINERLESS LABELS, METHOD OF MAKING A RELEASE COATING AND METHOD OF APPLYING A RELEASE COATING

(75) Inventors: Nancy L. Wantuch, Barker, NY (US); Khaled M. Khatib, Youngstown, NY (US)

(73) Assignee: Moore Business Forms, Inc., Grand Island, NY (US)

( * ) Notice: Subject to any disclaimer, the term of this patent is extended or adjusted under 35 U.S.C. 154(b) by 1430 days.

(21) Appl. No.: 08/551,469

(22) Filed: Nov. 1, 1995

(51) Int. Cl.[7] ............................. B32B 9/00; B32B 15/04
(52) U.S. Cl. ........................................ 428/41.8; 428/352
(58) Field of Search ................................ 428/41.8, 352

(56) References Cited

U.S. PATENT DOCUMENTS

| | | | | |
|---|---|---|---|---|
| 4,216,252 A | * | 8/1980 | Moeller | 428/352 |
| 4,386,135 A | * | 5/1983 | Campbell | 428/352 |
| 5,084,317 A | * | 1/1992 | Epple | 428/41.4 |
| 5,425,991 A | * | 6/1995 | Lu | 428/352 |
| 5,436,073 A | * | 7/1995 | Williams | 428/352 |

* cited by examiner

*Primary Examiner*—Terrel Morris
*Assistant Examiner*—Victor S Chang
(74) *Attorney, Agent, or Firm*—Nixon & Vanderhye P.C.

(57) ABSTRACT

A release coating that exhibits superior release properties includes about 70% Goldschmidt RC 711 silicone, about 30% Goldschmidt RC 726 silicone and about 3% of total silicone weight photo initiator. The silicone mixture provides a smooth release and better avoids the deleterious effects of aging such as yellowing and flaking. In addition, the silicone mixture is a soft silicone such that it will not come off in a printer. The invention also includes a method of making a release coating and a method of applying a release coating to a substrate.

11 Claims, 2 Drawing Sheets

RELEASE COATING FOR LINERLESS LABELS, METHOD OF MAKING A RELEASE COATING AND METHOD OF APPLYING A RELEASE COATING

BACKGROUND AND SUMMARY OF THE INVENTION

Linerless labels are becoming increasingly more popular due to the inherent advantages associated therewith, as a result of not requiring a separate release sheet. Typical linerless labels are disclosed in U.S. Pat. Nos. 5,292,713 and 4,978,415, and co-pending application Ser. Nos. 07/912,851 filed Jul. 13, 1992 (263–779), 07/907,511 filed Jul. 1, 1992 (263–811), 07/982,699 filed Nov. 30, 1992 (263–929), 08/078,918 filed Jun. 2, 1993 (263–1036), and 08/517,634 filed Aug. 22, 1995 (263–1376), the disclosures of which are hereby incorporated by reference herein.

The release layer is an important aspect of the linerless labels. Previous release layers have generally been too tight and inconsistent, resulting in a non-continuous release. In addition, the previous release layer's characteristics tend to deteriorate over time. Also, the previous release layers suffered from yellowing, thus detrimentally affecting the appearance of the linerless label. Still further, previous release layers were formed of a hard silicone, which tends to come off during printing and with age.

SUMMARY OF THE INVENTION

According to the present invention, a release coating for linerless labels is provided. The release coating includes about 60–80%, preferably about 70%, by weight of a first silicone; and about 20–40%, preferably about 30% by weight of a second silicone. The first silicone may have a specific gravity at 25° C. of about 1.0 g/cm$^3$, and the second silicone may have a specific gravity at 25° C. of 0.97–0.99 g/cm$^3$. In addition, the first silicone may have a flash point >100° C., and the second silicone may have a flash point >100° C. The release coating may further be provided with about 2–5%, preferably about 3% of total silicone weight of a photo initiator.

According to another aspect of the invention, there is provided a release coating for linerless labels that includes about 70%, by weight silicone having the characteristics listed in Table 1, and about, by weight silicone having the characteristics listed in Table 2.

According to yet another aspect of the invention, there is provided a method of making a release coating for linerless labels. The method includes mixing about 60–80%, preferably about 70%, by weight of a first silicone and about 20–40%, preferably about 30%, by weight of a second silicone. The method may further include maintaining a temperature of the mixture at at least about 49° C. and/or maintaining a viscosity of the mixture at about 340–450 cps, preferably about 350 cps.

According to still another aspect of the invention, there is provided a method of applying a release coating to a substrate. The method includes mixing about 60–80%, preferably about 70%, by weight of a first silicone and about 20–40%, preferably about 30%, by weight of a second silicone; processing the substrate; picking up the mixture with a roller; depositing the mixture onto the substrate; smoothing the mixture onto the substrate with a smoothing roller; and passing the substrate through a curing system with nitrogen inertion.

According to still another aspect of the invention, the release coating of the invention is suitable for use as a direct thermal label.

According to still another aspect of the invention, there is provided a linerless label including a substrate having a moisture content between 2–6%; and a release coating coated onto the substrate and having about 60–80% by weight of a first silicone and about 20–40% by weight of a second silicone.

It is an object of the present invention to provide a release coating for linerless labels, a method of making the release coating and a method of applying the release coating that overcome the problems noted above in prior release coatings. This and other objects of the invention will become clear from an inspection of the detailed description, when read in conjunction with the accompanying drawings.

DETAILED DESCRIPTION OF PREFERRED EMBODIMENTS

Figure 1:
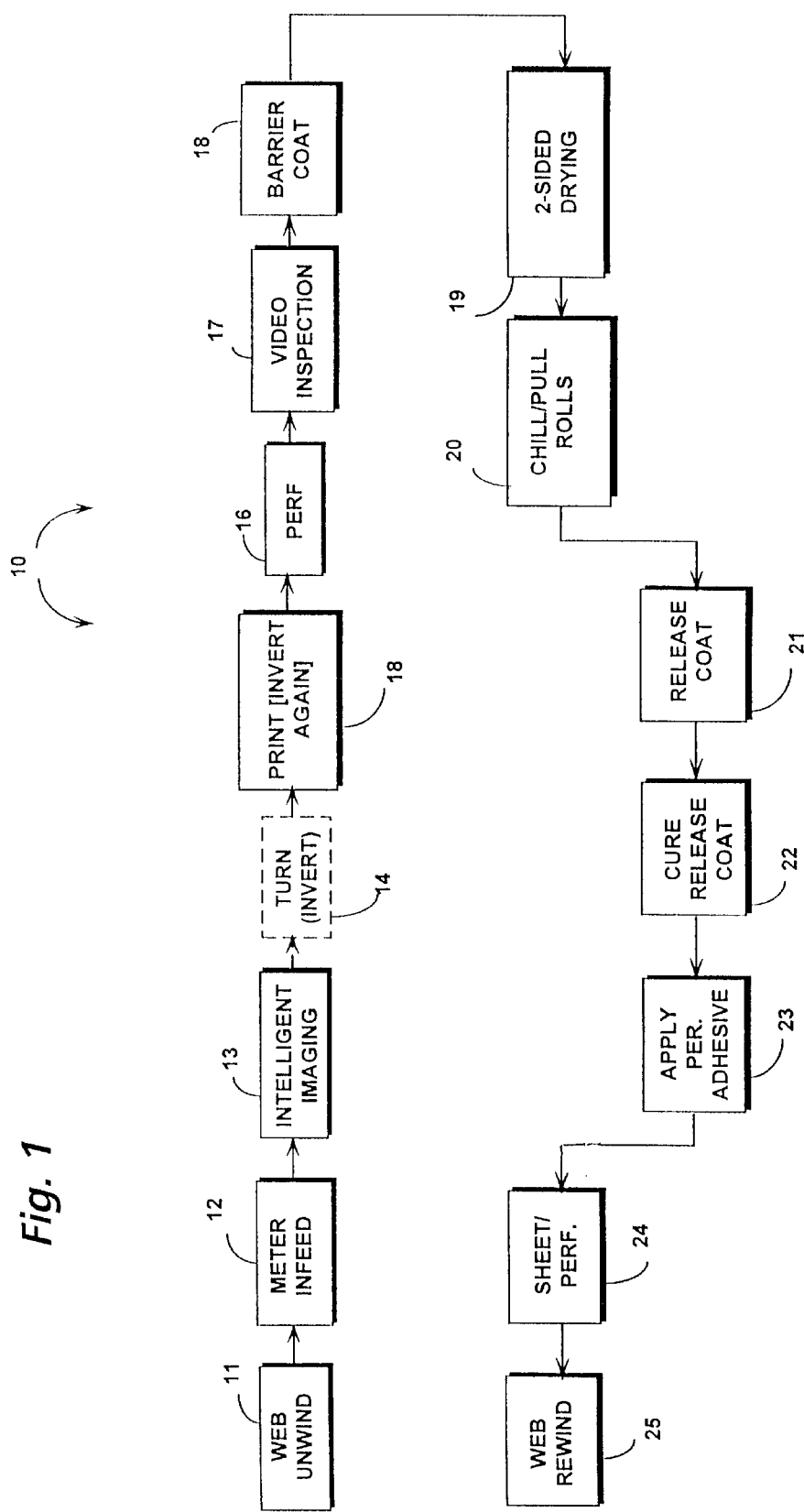
FIG. 1 is a schematic representation of a process for producing linerless labels.

FIG. 1 schematically illustrates a process that may be utilized to produce linerless labels. The web is typically unwound at box 11. A wide variety of webs may be utilized for the manufacture of the labels, and conventional web substrates include bond paper, coated papers, and films such as vinyl, polypropylene and polyethylene films. The web may be meter in-fed as indicated by box 12 to an imaging stage, such as an Intelligent Imaging® system, indicated at 13 in FIG. 1. Associated with the imaging stage 13 may be an inverting stage indicated at 14. One or a plurality of print stages-indicated schematically at 15 in FIG. 1—are provided.

Desirably, perfing is done early in the web processing, as indicated at stage 16 in FIG. 1, horizontal perfs being optionally applied to define the different labels in the direction of web movement (the first direction), which is indicated schematically by the direction of arrows in FIG. 1. Alternatively, the labels may be severed from the web by a cutting means (not shown). A video inspection station 17 may be provided after the perf station 16. After video inspection, a barrier coat is applied at stage 18.

After stage 18, the web passes to the drying stage 19. The drying stage 19 is capable of drying both faces or sides at the same time although if a barrier coat is applied to only one of the faces in the manufacture of the adhesive linings, one of the heat sources associated with the dryer 19 can be turned off. Typically, the heated web is cooled by being driven by the chill rolls of the chill roll take up station 20. The release coat stage 21, release coat curing stage 22, and permanent adhesive application stage 26 follow the station 20 stages.

After construction of the labels, in web form, they are often sheeted or longitudinally perfed (in the first direction, the direction of web movement) as indicated at stage 24 and then rewound as indicated at stage 25.

While a wide variety of materials may be used in each of the application stations set forth above, some materials have been found to be particularly useful. For example, in the practice of step 18 barrier coatings available from Franklin International Corporation and sold under the tradename DURACET 122 may be is applied, e.g., at a dry coat weight of about 3.76 grams per square meter ±10%.

Figure 2:
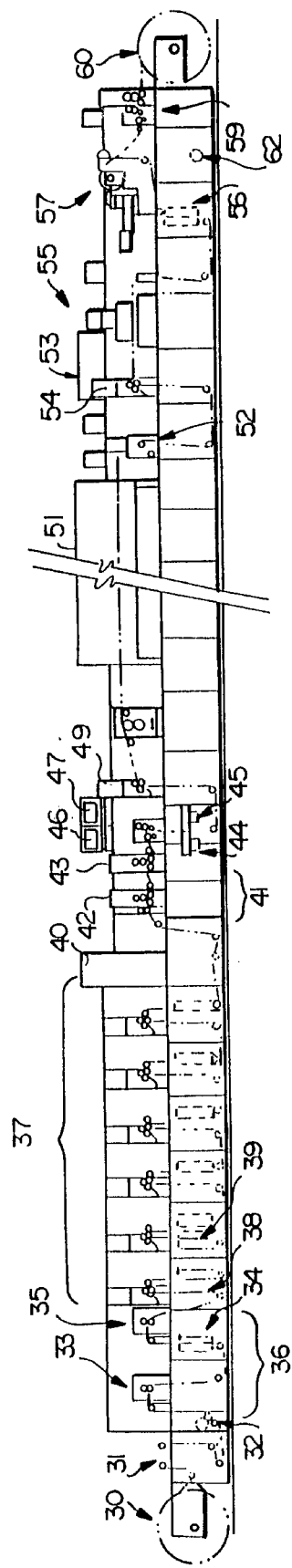
FIG. 2 is side elevational view showing an exemplary apparatus according to the invention.
Figure 3:
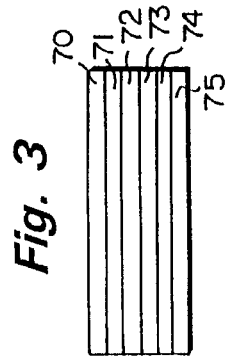
FIG. 3 is a schematic side view (greatly enlarged for clarity of illustration) of an exemplary linerless label.

In order to practice the method schematically illustrated in FIG. 1, equipment such as illustrated in FIG. 2 may be utilized. The equipment is shown in FIG. 2 in a particularly advantageous sequence in the direction of web travel (from left to right in FIG. 2), however some of the stations may be moved around.

One advantage of the equipment illustrated in FIG. 2 is that it is all commercially available. The basic equipment to which all the components are applied may be a lithographic press such as a Toppan Moore TMSW20V, available from Toppan Moore Co., Ltd. of Japan, a flexographic press such as a Webtron 1618 press, available from Webtron Corp. of Ft. Lauderdale, Fla., or the like. In a typical sequence for the manufacture of linerless labels, the equipment may print, apply a barrier coat, dry, UV silicone coat, UV cure, apply hot melt adhesive, and rewind. The equipment is capable of running at a normal operating speed of between 100 and 1500 feet per minute.

The first piece of equipment in the sequence illustrated in FIG. 2 comprises a web unwind apparatus 30, which is optionally followed by an edge guide 31 and a metered web infeed 32 apparatus. Intelligent Imaging® such as utilizing the Intelligent Imaging® printheads 33, 35 which have a set of turn bars 34 disposed between them is provided. The components 33 through 35 collectively form an Intelligent Imaging® system 36, which may be of any suitable conventional type such as one employing ion deposition techniques (e.g. MIDAX® printing technology, available from Moore Business Forms, Inc. of Lake Forest, Ill., or Indigo, available from Indigo, Ltd. of Israel, or Xeikon technology, available from Xeikon N.V. of Belgium), ink jet, laser or impact printer. Typically downstream of the intelligent imaging system 36 are a plurality of print stations indicated collectively at 37. Standard flexography or lithography can be used. Six stations 37 are illustrated in FIG. 2 but any number can be provided from one through eight. Turn bars 39 may be provided as illustrated. The turn bars 34, 39 allow printing on both sides with ease.

A main drive unit for a Webtron press is illustrated schematically at 40 in FIG. 2, followed by perf station 41, which may comprise two different single die perf units 42, 43. Video inspection is provided downstream of the perf station 41, as by video cameras 44, 45 having monitors 46, 47.

After video inspection, a coater 49 is provided for applying the barrier coat. The labels then pass to the dryer, which preferably comprises an air flotation, two-sided dryer with two natural gas fired burners. Each burner can provide about 880,000 BTU/hr. The web temperature leaving the dryer is typically 230° F. (140° F. for direct thermal stock), and cooling is typically provided by acting on the web with the pull/chill rolls 52. The dryer 51 is provided with zone controls for each of the two faces so that drying action to one of the faces can be turned off. Typically a pair of driven chill/pull rolls 52 are provided which are supplied with cooling water by a two ton chiller to cool the web down to about 150° F., somewhat less for direct thermal stock.

Downstream of the pull/chill rolls 52 is the coater 53 for applying the release coat (UV silicone). The cure system 55 preferably is a Fusion UV curing system having 600 watts per inch power. Standard "H" bulbs are used for curing and a light shield provides nitrogen inerting. An oxygen analyzer 54 may be associated therewith to monitor oxygen levels and control nitrogen flow to the UV light shield. The UV cure system is illustrated schematically at 55. Nitrogen inerting is necessary for curing Goldschmidt UV silicone (discussed below), available from Goldschmidt Chemical of Hopewell, Virginia, and in such case nitrogen flow is approximately 47 scfm, at 70° F. and 14.7 psi. A liquid nitrogen supply tank may be provided to supply the required flow and purity of nitrogen.

In the embodiment illustrated in FIG. 2, turn bars 56 are provided between the UV cure equipment 55 and the permanent adhesive application equipment 57. The equipment 57 preferably is for applying hot melt adhesive utilizing a hot melt slot die head. The hot melt adhesive is applied by the head to the web against an elastomer covered chill roll supplied with cooling water. For example an elastomer covering of about a half an inch thick (e.g. 90 durometer silicone) may be provided. A standard hopper type melt system with a gear pump may be used to deliver adhesive to the slot die head through a heated hose. The pump may be driven by a dc motor with a drive that tracks the press speed to maintain the constant coat weight up to the desired 500 feet per minute operation.

After adhesive application, a sheeter/perf unit 59 may be provided to form sheets and/or longitudinal perfs (in the direction of web movement). The unit 59 may comprise an in-line slitter. Rewind is provided by the apparatus 60, and since linerless labels are produced during rewind, the adhesive face of the web substrate comes against the release coat face, which it readily releases from when used by the consumer of the labels.

An exemplary linerless label is illustrated in FIG. 4, wherein one face is provided by the release coat (e.g. UV silicone) 70, adjacent the barrier coat 71. Printing/indicia 72 may be provided between the barrier coat 71 and the web substrate (e.g. paper) 73. On the opposite side of the paper 73 may be additional printing/indicia 74, and then the hot melt or like permanent adhesive 75 on the opposite face from the release coat 70. It is understood that the adhesive may be pattern coated or applied in a continuous fashion. Likewise, the barrier and tie coats may also be pattern coated or applied continuously to match the coating of the adhesive.

A release layer according to the present invention provides significant advantages over prior release layers described above. In particular, the specific configuration enables a smooth, continuous release. In addition, the material is better able to withstand the effects of aging, i.e., avoiding yellowing or flaking. Furthermore, the release layer according to the invention is formed of a soft silicone that does not come off in the printer or with age. The silicone mixture of the invention enhances the optical density of the printed images and may even lead to extended head usage for thermal print heads as the coefficient of friction between the print head and the substrate is reduced due to the silicone coating.

A UV silicone coating is particularly useful as a release coating since it not only provides the release coat for permanent adhesive moved against it, but also acts as a protective and visually pleasing coating over the product. In accordance with the invention, a preferred silicone product is a mix of Goldschmidt silicone RC 711 (about 60–80% and preferably about 70%) with RC 726 (about 20–40% and preferably about 30%) and photo initiator Darocur 1173, available from Ciba Geigy, (about 2–5% and preferably about 3% of total silicone weight) added. The Goldschmidt silicone contains some acrylates. The RC 711 silicone has the characteristics provided in Table 1, and the RC 726 silicone has the characteristics provided in Table 2.

TABLE 1

| Physical Properties | | REMARKS |
|---|---|---|
| Release properties | tight | — |
| Active matter | 100% | Volatile content <1% |
| Viscosity, 25° C. (77° F.) | approx. 500 mPas | — |
| Specific gravity, 25° C. (77° F.) | approx. 1.0 g/cm³ | — |
| Color | greenish | The color of TEGO ® RC Products is absolutely irrelevant as to their efficiency/properties, as guaranteed by test certificate |
| Appearance | clear | — |
| Flash point (DIN 51758) | >100° C. (>212° F.) | — |
| Guaranteed shelf life | 12 months | Subject to storage in sealed light-proof containers at temperatures below 30° C. (86° F.) |
| Guaranteed pot life (at room temperature) a) EB-curing b) UV-curing (with photoinitiator added) | a) not measurable b) min. 72 hours | It is recommended that TEGO ® RC Products are stored in the dark at temperatures not exceeding 30° C. (86° F.) |
| Inerting | necessary | EB-curing and UV-curing require inerting by nitrogen |

TABLE 2

| Physical Properties | | REMARKS |
|---|---|---|
| Release properties | premium/easy | — |
| Active matter | 100% | Volatile content <1% |
| Viscosity, 25° C. (77° F.) | approx. 1000 mPas | — |
| Specific gravity, 25° C. (77° F.) | 0.97–0.99 g/cm³ | — |
| Color | yellowish | The color of TEGO ® RC Products is absolutely irrelevant as to their efficiency/properties, as guaranteed by test certificate |
| Appearance | clear | — |
| Flash point (DIN 51758) | >100° C. (>212° F.) | — |
| Guaranteed shelf life | 12 months | Subject to storage in sealed light-proof containers at temperatures below 30° C. (86° F.) |
| Guaranteed pot life (at room temperature) a) EB-curing b) UV-curing (with photoinitiator added) | a) not measurable b) min. 72 hours | It is recommended that TEGO ® RC Products are stored in the dark at temperatures not exceeding 30° C. (86° F.) |
| Inerting | necessary | EB-curing and UV-curing require inerting by nitrogen |

In practice, the silicone bath container should be covered at all times with a plastic cover to prevent contamination and the container must be cleaned prior to decanting of the mixture. The silicone coating fountain should be checked for skew every three months to ensure parallel distance between the anilox roll and the coating plate. A rubber coating sleeve must be set evenly across the web to ensure an even deposit of the silicone coating across the web and to prevent silicone skip coating.

The components of the silicone solution bath must be mixed thoroughly before coating. While constantly stirring the silicone mixture, the container should be heated to about 60–72° C. so that the temperature of the silicone in the container is above 38° C., and preferably at least 49° C. The viscosity of the mixture should be maintained between 340–450 cps and preferably about 350 cps.

After the mixture is formed, the substrate or thermal base paper is processed. The thermal base paper, which has a top/barrier coating, is passed through a web cleaner and a corona treater so that the surface energy of the base paper is optimum for silicone anchorage. The paper then passes through a dryer system at about 60° C. so that the moisture content of the paper is about 2–6%, and preferably about 4%. A lower moisture content of the paper ensures better anchorage of the silicone coating.

The mixture is pumped to the deposit pan through a heat-resistant hose with an inline filter to prevent contaminants from being deposited into the pan. A peristalic pump is used to avoid introduction of air bubbles, which can cause streaks in the silicone coating. From the pan, the mixture is picked up by a ceramic anilox roller of a specific volume. A stainless steel doctor blade system scrapes the silicone into the cells of the anilox with a backer roller depositing the excess back into the pan. Of course, other types of doctor blades could be used, depending on the type and mixture of silicone. The anilox roller cell volume deposit is directly related to the coat weight of the silicone mixture.

After the cells deposit the silicone mixture onto the paper, a smoothing roller of specific durometer, preferably 80, smooths the silicone onto the paper. The roller preferably has a Shore D hardness. Directly after application, the coated substrate passes through an ultra violet curing system with nitrogen inertion, which reduces the oxygen level to no more than 50 ppm so that proper and absolute curing exists. The silicone coat weight is about 1.5 grams/m²±10%, and the press speed is preferably about 325 ft/min.

After the silicone is applied to the substrate, the hot melt adhesive is applied from a die slot hot melt adhesive head. A suitable adhesive is DURO-TAC 4144-34 available from National Starch and Chemical Company.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A release coating for linerless labels, comprising:
    about 60–80% by weight of a first silicone; and
    about 20–40% by weight of a second silicone, wherein said first silicone comprises substantially a specific gravity at 25° C. of about 1.0 g/cm³, and wherein said second silicone comprises substantially a specific gravity at 25° C. of 0.97–0.99 g/cm³.

2. A release coating according to claim 1, comprising about 70% by weight of said first silicone and about 30% by weight of said second silicone.

3. A release coating according to claim 1, wherein said first silicone comprises a flash point >100° C., and wherein said second silicone comprises a flash point >100° C.

4. A release coating according to claim 1, further comprising about 2–5% of total silicone weight of a photo initiator.

5. A release coating according to claim 4, further comprising about 3% of total silicone weight of a photo initiator.

6. A release coating for linerless labels, comprising:

70% by weight silicone having the characteristics listed in Table 1; and

30% by weight silicone having the characteristics listed in Table 2.

7. A release coating for linerless labels, consisting essentially of:

70% by weight silicone having the characteristics listed in Table 1;

30% by weight silicone having the characteristics listed in Table 2; and

3% of total silicone weight of a photo initiator.

8. A method of making a release coating for linerless labels, comprising mixing about 60–80% by weight of a first silicone and about 20–40% by weight of a second silicone, wherein said first silicone comprises substantially a specific gravity at 25° C. of about 1.0 g/cm$^3$, and wherein said second silicone comprises substantially a specific gravity at 25° C. of 0.97–0.99 g/cm$^3$.

9. A method according to claim 8, wherein said mixing step comprises mixing about 70% by weight of a first silicone and about 30% by weight of a second silicone.

10. A release coating for linerless labels as in claim 1 and suitable for use as a direct thermal label.

11. A linerless label comprising:

a substrate having a moisture content between 2–6%; and a release coating coated onto said substrate, said release coating having about 60–80% by weight of a first silicone and about 20–40% by weight of a second silicone, wherein said first silicone comprises substantially a specific gravity at 25° C. of about 1.0 g/cm$^3$, and wherein said second silicone comprises substantially a specific gravity at 25° C. of 0.97–0.99 g/cm$^3$.

* * * * *